United States Patent
Cliff

[19]

[11] Patent Number: 6,109,440
[45] Date of Patent: Aug. 29, 2000

[54] DECORATIVE PADDED GIFTMAILER

[76] Inventor: William Cliff, 1234 Meadow Lark Dr., Vacaville, Calif. 95687

[21] Appl. No.: 09/184,774

[22] Filed: Nov. 2, 1998

[51] Int. Cl.[7] .................................................. B65D 81/03
[52] U.S. Cl. ............................ 206/523; 383/84; 383/109; 428/35.2
[58] Field of Search ............................ 53/460; 206/523, 206/591; 383/93, 110, 84, 109; 428/35.2

[56] References Cited

U.S. PATENT DOCUMENTS

| | | | |
|---|---|---|---|
| 3,867,874 | 2/1975 | O'Neil | 206/523 |
| 3,948,436 | 4/1976 | Bambara | 206/523 |
| 4,011,798 | 3/1977 | Bambara et al. | 206/523 |
| 4,087,002 | 5/1978 | Bambara et al. | 206/523 |
| 4,620,633 | 11/1986 | Lookholder | 206/523 |
| 5,273,361 | 12/1993 | Jillson | 383/93 |
| 5,544,473 | 8/1996 | Maida et al. | 206/591 |

*Primary Examiner*—Jim Foster

[57] ABSTRACT

A durable padded decorative giftmailer which simplifies the process of gift giving for purposes of mailing articles through mailing and parcel distribution channels. In greater detail, the exterior envelope comprising of a spun-bonded polyolifen finer such as Tyvek, which enhances the resistance to tears, water, punctures and blemishes. The substrate is then injected with water based inks forming festive designs for specific occasions which are mar and blemish resistant to the rigors of the mailing and shipping channels. Additionally, incorporating an interior inner liner made of a blown polyethylene foam having characteristics of being rigid and flexible and having the same recycling capabilities as that of the exterior substrate thus simplifying the ease of recycling the decorative mailer.

9 Claims, 6 Drawing Sheets

DECORATIVE PADDED GIFTMAILER

BACKGROUND OF INVENTION

This invention is related to improvements in an article of manufacturing padded gift mailers in which further improvements contribute to the utility of the article in preparing the gift for mailing.

DESCRIPTION OF PRIOR ART

Consumers wish to send a number of gift items to friends and relatives through major shipping carriers such as the United States Postal Service, United Parcel Service and Federal Express. Consumers are accustomed to inserting these gift items into various padded mailers as a precautionary and further protection of the item. A number of mailers have been introduced to the market place, none have been without drawbacks. Padded mailers to date have had one or more drawbacks. U.S. Pat. No. 5,273,361 (Jillson) discloses a rugged mailing envelope which is produced generally in the following manner. The manufacturing process for these mailers is a combination of kraft papers, polyethylene films and plastic sheets of polypropylene impregnated with a multitude of air bubbles which are bonded together by thermal heat. Although inexpensive to manufacture, these mailers are an environmental problem and have become a concern to the Environmental Protection Agency, State Agencies and Environmental Groups. After these mailers have been disposed of, they are not recognized in any current recycling stream because of the molded conglomeration of the paper, film and bubble liner. Neither recycling stream, paper or plastic will accept or identify these mailers because of the manufacturing process in which they were produced. There is currently no feasible process available to separate these combined materials thus leaving no alternative except disposing these items into landfills. Also, two of the components that being a polyethylene film and polypropylene bubble liner are not biodegradable and the inks which are oil based have toxic components and express a concern when leaching occurs after disposed of in landfills. These mailers have another drawback concerning an issue of durability. The majority of consumers are under the assumption that these padded mailers are extremely durable or rugged and although the mailers are derived of a combination of plastics and films, they blemish, snag, tear and puncture easily thereby damaging the contents inside and or losing the item completely through the mailing and/or parcel system. The bubble liner has a limited shelf life which after several months, the air begins to escape from the impregnated air capsules. The padded mailers also have a flat compressed edge on outer sides and bottom which is produced through the manufacturing process by instilling thermal heat into the outer edges and squeezing the outer surface together to adhere with the plastic liner thus forming a bonded edge. These edges are prominent and easily snag inside pneumatic equipment when encountered with other abutting edges thus eliminating a fail-safe product exposing the item to damage. U.S. Pat. No. 4,011.798 (Bambara) is an improved cushioned shipping bag which has the features of incorporating a tear resistant layer but only internally to prevent articles from penetrating outwardly but does not eliminate the other issues of concern, such as environmental issues or the potential prominent edges that snag easily with opposing surfaces. Bambara discloses an outer kraft liner padded shipping bag with a tear resistant inner liner used specifically for transporting sharp edged articles. Bambara discloses the formality and procedure of manufacturing procedure comparable to the Jillson et al patent. However, Bambara does not disclose any added features over Jillson except for a durable inner liner. Bambara also does not disclose any environmental features and in fact has several multilayers of materials that have opposing properties to various environmental channels making it impossible to recycle. Bambara also does not teach us of the convenience of using the product as a gift mailer specifically for gift giving to friends and relatives with festive printed designs specifically related to special occasions, holidays and the mail order industry. U.S. Pat. No. 5,544,473 (Miada et. al.) discloses a mailing and/or shipping envelope provided with a packaging or cushioning material to help protect fragile or breakable articles forming an interior. Miada discloses providing an envelope with an effective, biodegradable cushioning material described as a fibrous paper material with the combination of an outer substrate also consisting of a paper-like substrate or the like which is a standard commercially available material for envelopes. Miada does not teach us the benefits of using Tyvek a spun bonded polyethylene which is produced by E.I. Dupont on the outer surface making it tear, water and puncture resistant with recycling capabilities up to 30 times greater than paper fibers. Miada also does not teach us of using a interior foam liner also made of a polyethylene substrate in which compliments both substrates together when used for recycling benefits. Miada also does not disclose the benefits of sending gifts with their mailer and thus make no mention of incorporating festive designs onto the exterior perimeter of the mailer. Miada does elaborate on the benefits of utilizing a flexible and expandable packing material forming a multitude of slits which is arranged to allow the packing material to be pulled into a three dimensional shape in which the packing material cushions and protects the article inside the packing material. Even though this method performs a cushioning layer, the materials involved in this process are, fragile and thus cannot prevent an article from being damaged by tears, punctures, moisture and excessive pressure.

OBJECTS AND ADVANTAGES

Accordingly, it is an object of this invention to provide a new and improved padded gift mailer.

It is another object of this invention to provide a new and improved inner cushion liner which is rigid and flexible and has a specific configuration used exclusively for the expediency of a manufacturing process.

It is yet another object of this invention to provide an improved outer sleeve such as a spun bonded olefin such as Tyvek or the like, which is tear, water, mar and puncture resistant which can withstand the rigors of shipping and handling.

It is still yet another object of this invention to provide a combination of two substrates, the interior liner and the outer envelope sleeve having the same recycling properties in which enhance the simplicity of the recycling procedure.

It is still another object of this invention to provide a superior substrate to be utilized as an outer sleeve, a spun bonded olefin such as Tyvek which is anti-resistant whose production allows for a convenient and extremely rapid insertion of interior sleeves.

It is yet another object of this invention to provide a water based ink injected into the spun bonded olefin fibers which will present a superior surface enhancing the quality of designs.

It is still yet another object of invention to provide a "To and From label" which coordinates to the printed design on the padded mailer.

It is yet another object of this invention to provide a mailer with superior surface having contoured edges specifically designed for ease of distribution and eliminating potential snagging in pneumatic equipment.

Other objects, features and advantages of the invention in its details of construction and arrangement of parts, will be seen from the above following description of the preferred embodiment when considered with the drawing and from the appended claims.

DESCRIPTION OF THE PREFERRED EMBODIMENT

Figure 1:
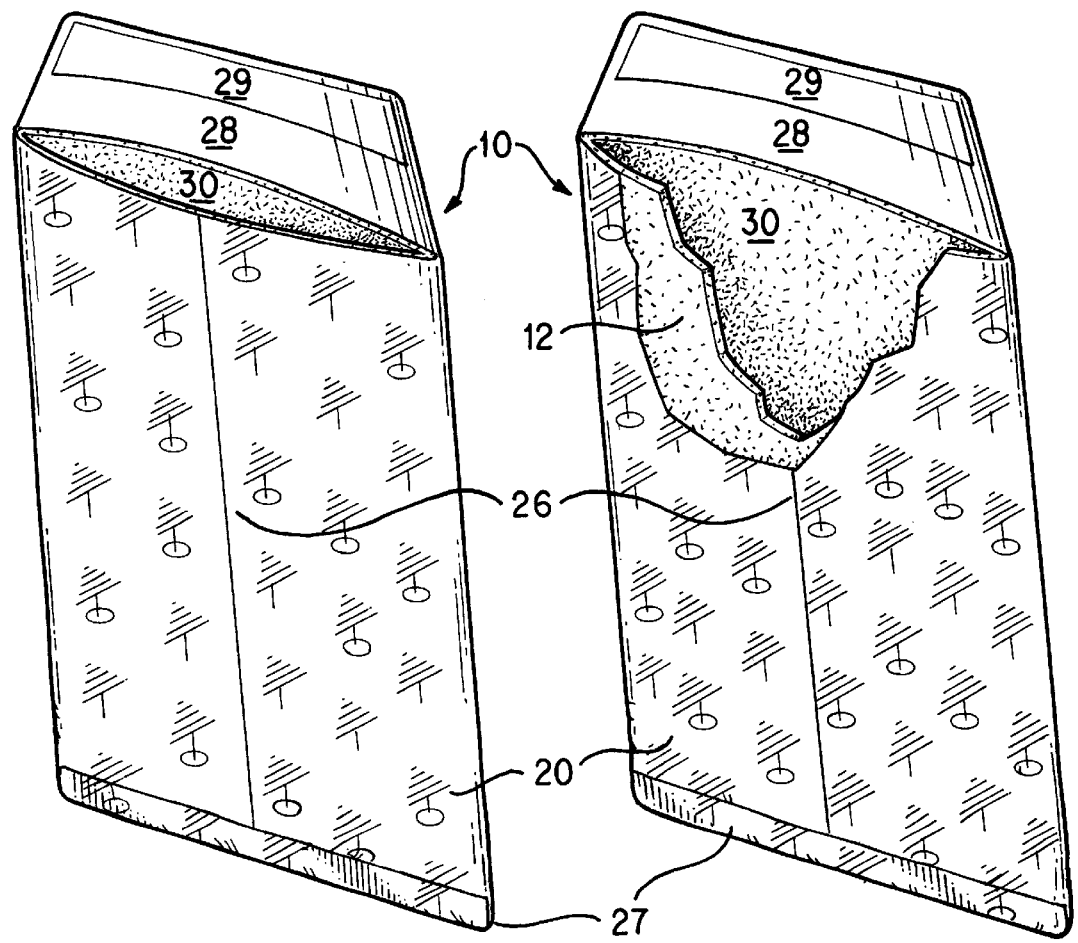
FIG. 1. Shows two perspective views of the decorative padded mailer of the present invention illustrating the flexibility of the two materials combined.
Figure 2:
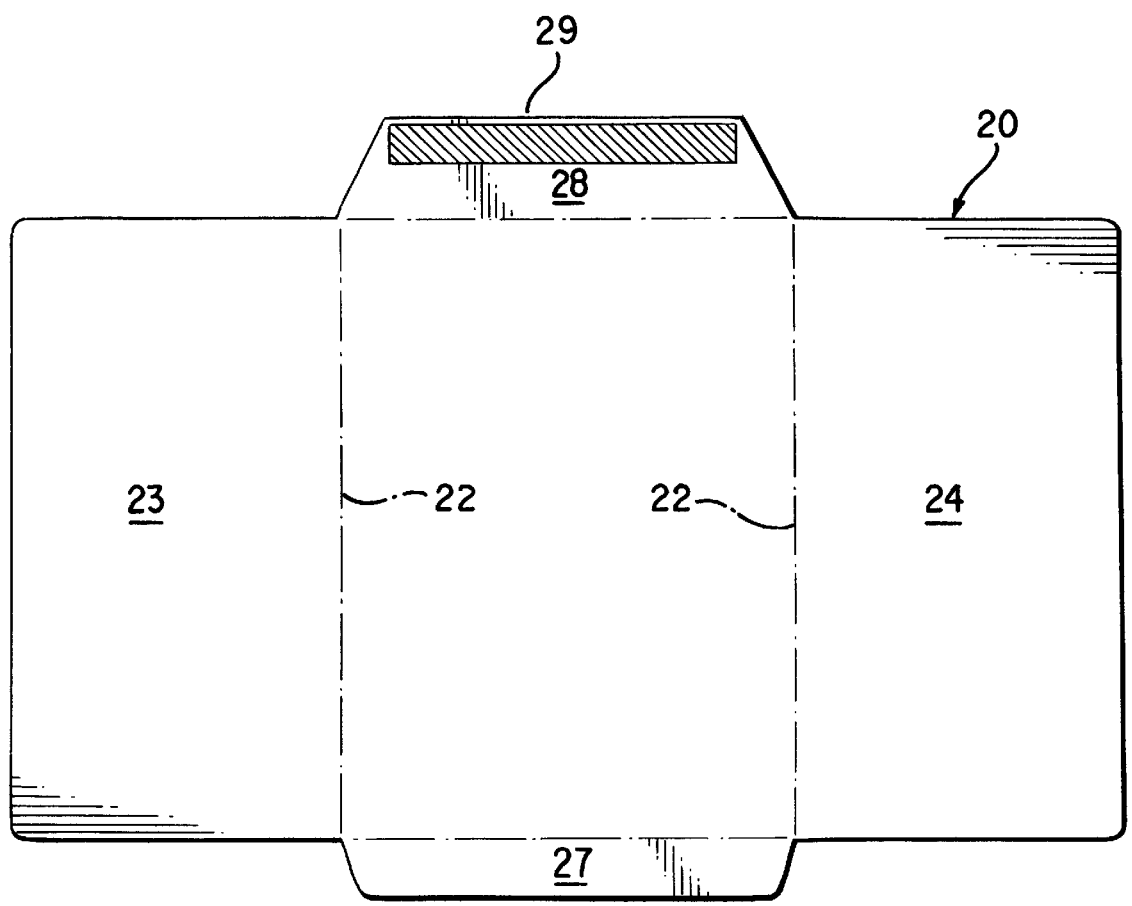
FIG. 2. Shows a plan view of the outer sleeve from which the padded mailer from FIG. 1 is formed.
Figure 3:
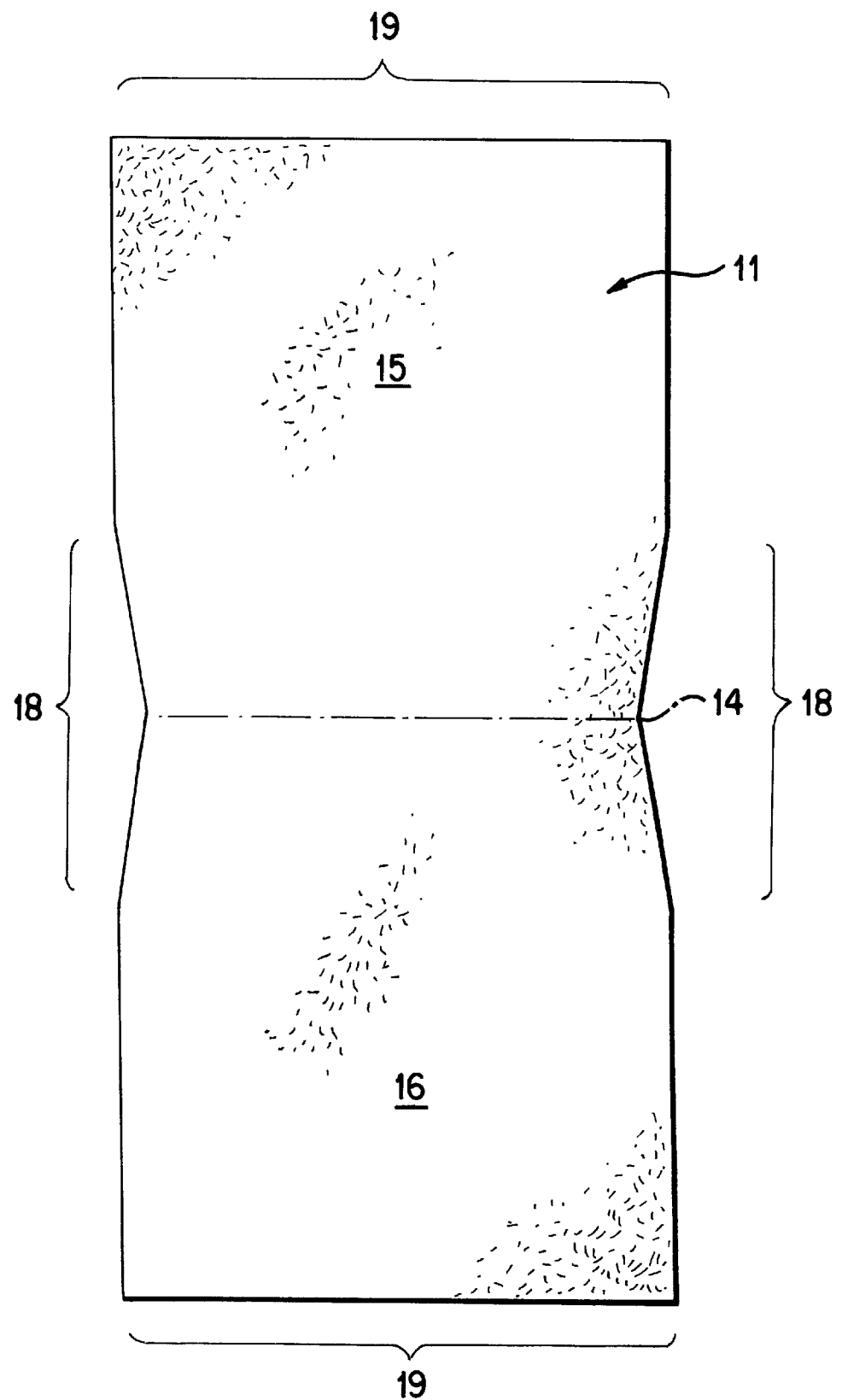
FIG. 3 Shows a plan view of the inner polyethylene foam sleeve material
Figure 4:
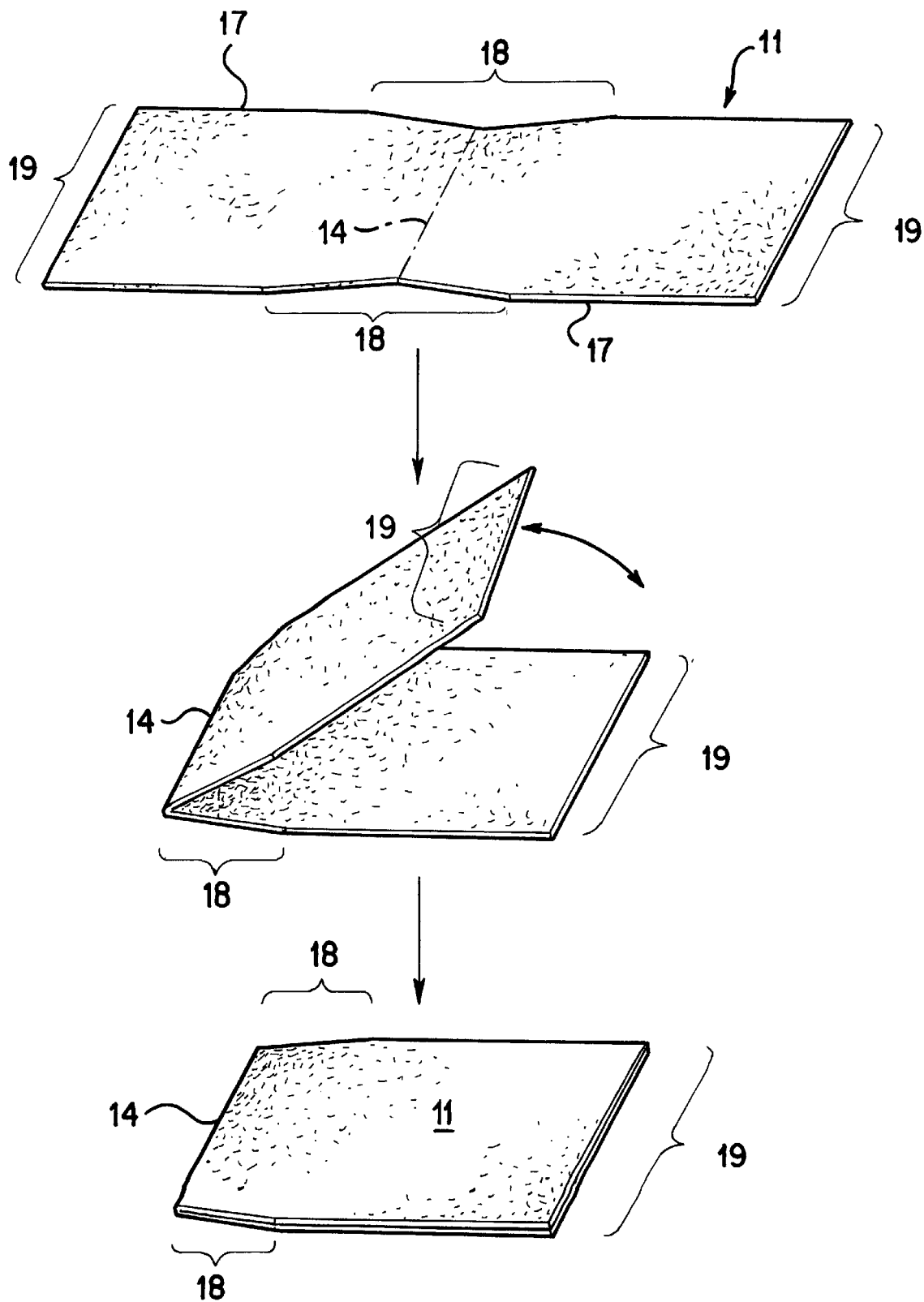
FIG. 4. Shows a perspective view of the polyfoam liner folded in preparation for its insertion into the sleeve.
Figure 5:
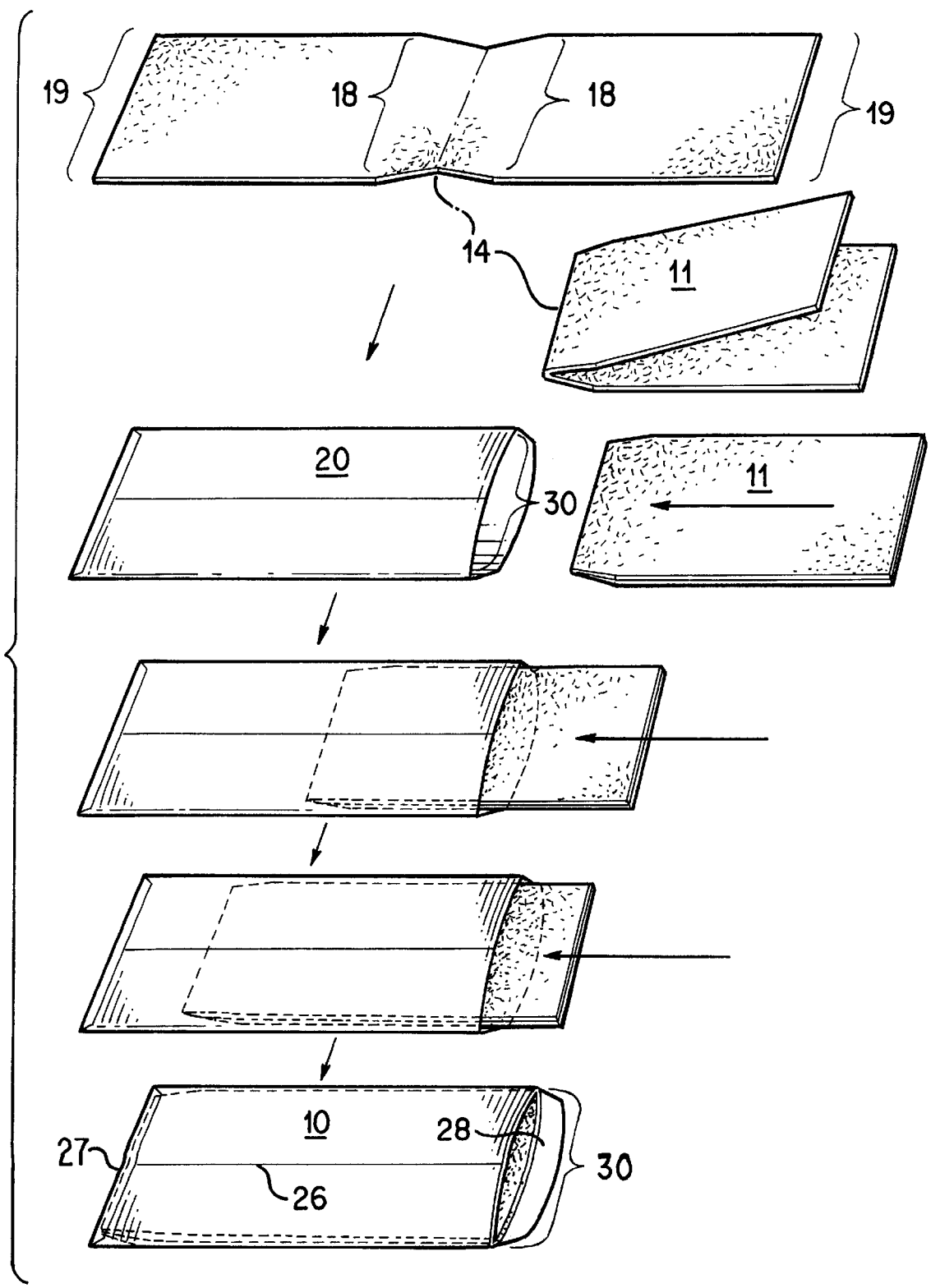
FIG. 5. Is an illustration of sequence of the insertion of the inner polyfoam sleeve into the outer Tyvek sleeve.

Referring now to the drawings, the padded mailer 10 of the present invention is illustrated in the perspective view of FIG. 1. which also displays a perspective view of the first and second multilayer sheets 20 and 12 which are joined together around the upper opening collar perimeter of the mailer 30 by applying a water based adhesive or a form of hot melt tape. In the sleeve embodiment of FIG.1 an outer layer 20 a self supporting, non-transparent sheet material is derived from e, mill roll of sheet material 20 which includes printed decorative patterns for specific occasions and celebrations as shown. The sheet material is comprised of a spun bonded olefin such as Tyvek, which is produced by I.E.Dupont or a material of like characteristics which is extremely light, very thin, has a paper like quality but is produced from polyethylene plastic fibers pressed into a nonwoven sheet: material. The inner layer 12 consist of a sheet material polyethylene foam padding which is spongelike, rigid, flexible and extremely light. The thickness of the foam is approximately ⅛ to ¼ inches and has high resilience. The layer combination of both 20 and 12 produce a cushioned polyethylene foam which has extraordinary characteristics of being tear, water and puncture resistant. The combination of these two substrates produces a material that can be economically recycled several times over thus eliminating any additional distressing efforts to separate before recycling. In a preferred embodiment, to produce the decorative padded mailer 10 of FIG. 1 the sheet material 20 is first embedded with water based inks to produce festive printing designs. The injection of the inks into the spun bonded fibers produces prints which cannot blemish under rigorous conditions. The printed sheet rolls are then die cut into specific predetermined sizes. In FIG. 2, the die cut blanks are folded along the fold lines 22 to form opposite sleeve panels 23 and 24. These rear wall panels are longer in length than the overall length of opposite wall panel 25. When folded downward panels 23 and 24 overlap each other to produce a center seam 26. When panels 23 and 24 are folded downward an adhesive such as a water based glue or a form of hot melt tape is applied to the marginal edge of either panel to preform the front and rear wall panels. The adhesive is now applied to the end portion flap 27 and folded securing the bottom portion of the mailer sleeve. A larger and wider adhesive means 29 is now applied to the closure flap 28 and is covered by a non adhesive coated strip preventing any premature closure. The padded mailer 10 has a inner layer of a pre-formed foam liner which is shaped consistently from a die cut press producing the inner sleeve blank 11 FIGS. 3 and 4 from the flat sheet of material polyethylene foam 12. When folded, this foam sheet produces a pre-formed sleeve 11 FIGS. 3 and 4 designed specifically for insertion into the outer Tyvek sleeve 20 which will completely envelope the inner foam padding sleeve 11. More specifically, the inner foam liner of padded mailer 10 is die cut from dies which are designed and sized specifically for outer sleeve 20 as shown in FIGS. 1 and 5, These die cut sleeves 11 have a distinctive shape formed by the dies designed to simplify and expedite the inserting of the foam sleeves 11 into outer sleeve 20. To begin with, the shape of the inner foam sleeve has a perpendicular vertically disposed scoria line 14 located precisely in the center of sheet foam die-cut 12 producing two identical panels, a top and bottom 15 and 16. The outer edge's 17 of the polyfoam sleeve 11, has an incline from which derives from the outer exterior corners 19, which runs evenly to the junction point 18 and then descends inward to the vertically disposed score line 14, identically begins to ascend to an opposite junction point 18 in which now runs directly straight to the opposing outer corner 19. Both panels, 15 and 16 measure the same in length and decree of descending angle making both top and bottom panels 15 and 16 identical to each other when folded and isosceles in configuration. The polyethylene foam sheet material 12 is extremely light, rigid, and self supporting, which is ideal for die cutting, folding and inserting. FIG. 4 shows the embodiment of the inner polyethylene sleeve 11 after die cut and folded which is properly ready to be inserted into a hopper for dispersing the folded sleeves into the outer Tyvek sleeves 20 by automation. Line 14 once folded also has a has edge and has no ingress or egress access and is approximately ⅜ shorter overall in length than top opening 30. The overall difference in length between 14 and 30 will stay consistent even with the various modifications in sizes of sheet material 20. FIG. 5 illustrates the method of how the polyfoam sleeve is inserted into the Tyvek sleeve. The specific method of making and assembling the padded mailer insertion between the outer sleeve 20 and the inner polyfoam sleeve 12 is done through a manufacturing procedure in which the tapered polyfoam sleeve 12 is aligned with outer sleeve 20 through timing machinery. When both sleeves align at their stations outer sleeve 20 is held in position by vacuum suction cups. The opening end 30 of outer sleeve 20 is lightly opened with an air tube creating the insertion of polyfoam liner 12 to be pushed and air fed into the outer sleeve 20. The folded edge 14 of the polyfoam sleeve 11 is shorter in length up to junction 18 for the sole purpose of inserting rapidly into cuter sleeve 20. This manufacturing procedure greatly increases production over any current method. Once the polyfoam sleeve 11 is fully inserted into outer sleeve 20, another water based adhesive is applied between the two layers of materials around the edges of the padded mailer opening 30. 2he combination of these two substrates produce a decorative mailer that is extremely light, tear resistant, water resistant and puncture resistant. The inner layer foam 12 is also an ideal cushioning material in which its properties of spongelike resilience is ideal for protecting articles from damage. With the embodiment of the padded mailer 10 shown in FIG.1, outer sleeve 20 substantially completely encloses interior 12, however, preferably outer envelope 20 also forms a top opening 30 that provides access to interior 12.

Figure 6:
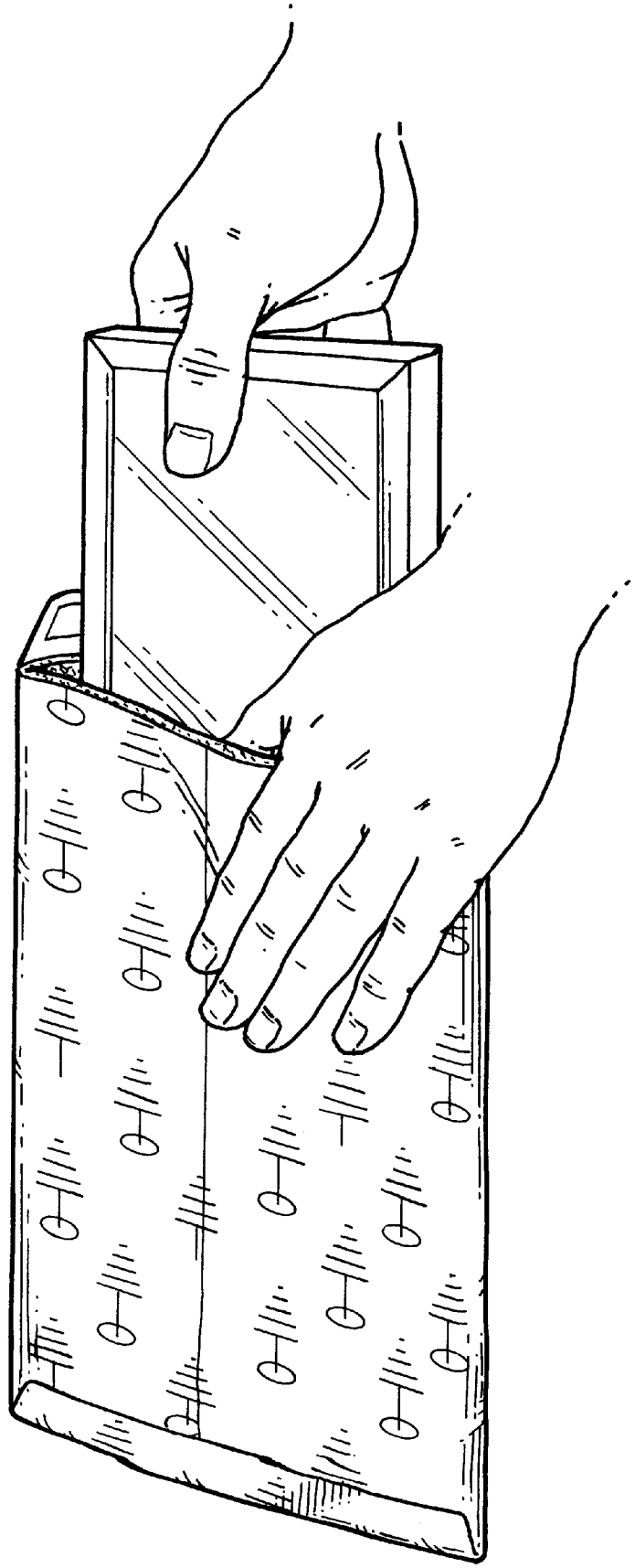
FIG. 6. Shows an article being inserted into the padded gift mailer.

FIG. 6 shows an article being inserted into the decorative padded mailer. Once article is inserted the consumer can pull off the release liner 29 and fold the top flap 28 to secure the article. The manufacturing procedure as explained above expedites the rate of production significantly and introduces a procedure and mailer where one did not exist before. The above stages of manufacturing produces a unique, high quality decorative padded mailer at a feasible price.

The State of California, Public Resources Code, Division 12.7 (Commencing with Section 18000), requires manufacturers of rigid plastic containers, on and after Jan. 1, 1992, to use container material content labels to indicate the type of plastic used to create the bottle or container. Section 18015 specifies the code abbreviation to be used. The number "2" designates HDPE, high density polyethylene and the number "4" designates LDPE low density polyethylene.

What I claim is:

1. A decorative padded mailer wherein the improvement comprises an outer sleeve which is a non-woven spun bonded olefin which is injected with water based inks to form a design on the sleeve, said outer sleeve completely envelopes entirely a layer of a pre-concerted shape of a polyethylene foam material providing rigidity, flexibility and cushioning to the embodiment of the padded mailer.

2. A decorative padded mailer of claim 1 wherein said outer sleeve material is a spun bonded olefin sold under the trademark Tyvek®, said material is identified in the recycling steam as a polyethylene #4.

3. A decorative padded mailer of claim 1 wherein said layer of polyethylene foam is rigid and flexible, said foam is several times thicker than the outer sleeve, whereby the foam solidifies and strengthens the outer sleeve and forms a liner, said foam liner is identified in the recycling stream as a polyethlene #2.

4. A decorative padded mailer of claim 3 wherein the improvement comprises said layer of polyethylene foam is die cut and folded at center score line with a specific form and specific dimensions, said polyethylene foam is now a shape for incorporating into an automatic equipment for inserting ployethylene sleeves into padded gift mailers.

5. A decorative padded mailer of claim 2 wherein the improvement comprises said outer sleeve material is insertable into an automatic equipment line as the receiver for polyethylene sleeves combined together simultaneously producing padded gift mailers.

6. A decorative padded mailer of claim 1 wherein the adjoining seam of the sleeve is located in the center rear panel of the sleeve, and bottom seam is folded and is attached to the lower rear panel, said seams produce a contour shape around outside edges of the padded mailer acting as a deterrent against snags.

7. A decorative padded mailer of claim 1 wherein the outer sleeve is adjoined together by using water based adhesives that are non-toxic.

8. A decorative padded mailer of claim 1 wherein the outer sleeve material enveloping over an inner liner of polyethylene foam, wherein the adhesive means is a water based adhesive or tape administered to the inside portion of approximately ¼" below outer edge of upper opening on both front and back panel.

9. A decorative padded mailer of claim 1 which utilizes the inner and exterior substrates when combined are derived from over 60% post consumer recycling materials.

* * * * *